United States Patent [19]

Kuster et al.

[11] Patent Number: 4,802,903

[45] Date of Patent: Feb. 7, 1989

[54] METHOD AND APPARATUS FOR CURVING A GLASS SHEET

[75] Inventors: Hans-Werner Kuster, Aachen; Norbert Schwarzenberg, Herzogenrath, both of Fed. Rep. of Germany; Luc Vanaschen, Eupen, Belgium

[73] Assignee: Saint-Gobain Vitrage, Paris, France

[21] Appl. No.: 95,850

[22] Filed: Sep. 14, 1987

[30] Foreign Application Priority Data

Sep. 25, 1986 [DE] Fed. Rep. of Germany ....... 3632556
Sep. 25, 1986 [DE] Fed. Rep. of Germany ... 8625618[U]

[51] Int. Cl.⁴ .......................................... C03B 23/035
[52] U.S. Cl. ....................................... 65/106; 65/273; 65/287
[58] Field of Search .................. 65/104, 106, 273, 287

[56] References Cited

U.S. PATENT DOCUMENTS 4,356,018 10/1982 McMaster .............................. 65/104
4,612,031 9/1986 Bennett ................................. 65/106
4,661,139 4/1987 Reese et al. ........................... 65/106
4,682,997 7/1987 Halberschmidt et al. ............ 65/106

Primary Examiner—Robert L. Lindsay
Attorney, Agent, or Firm—Oblon, Fisher, Spivak, McClelland & Maier

[57] ABSTRACT

In a method of curving a glass sheet with the aid of a hot gas stream with a large cross sectional area, whereby the glass sheet is pressed against a curving form, in certain prescribed edge regions of the glass sheet in static pressure component of the flowing gas is increased by reducing the flow speed of the flow component (of the hot gas stream) traveling in the radial direction along the surface of the glass sheet, which speed reduction is accomplished by the interposition of barriers in the path of this flow component. The preferred such barriers are pressure baffles (38), which are disposed at certain selected locations on the edge of the curving form (31), said baffles being oriented perpendicularly to the terminal tangents of the forming surface (32) of the curving form (31).

12 Claims, 3 Drawing Sheets

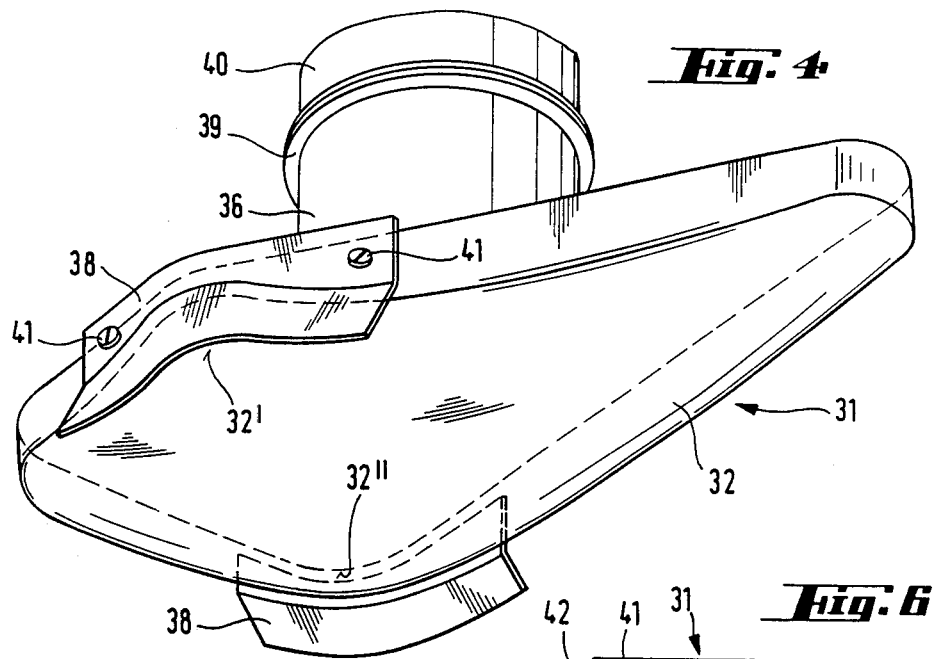
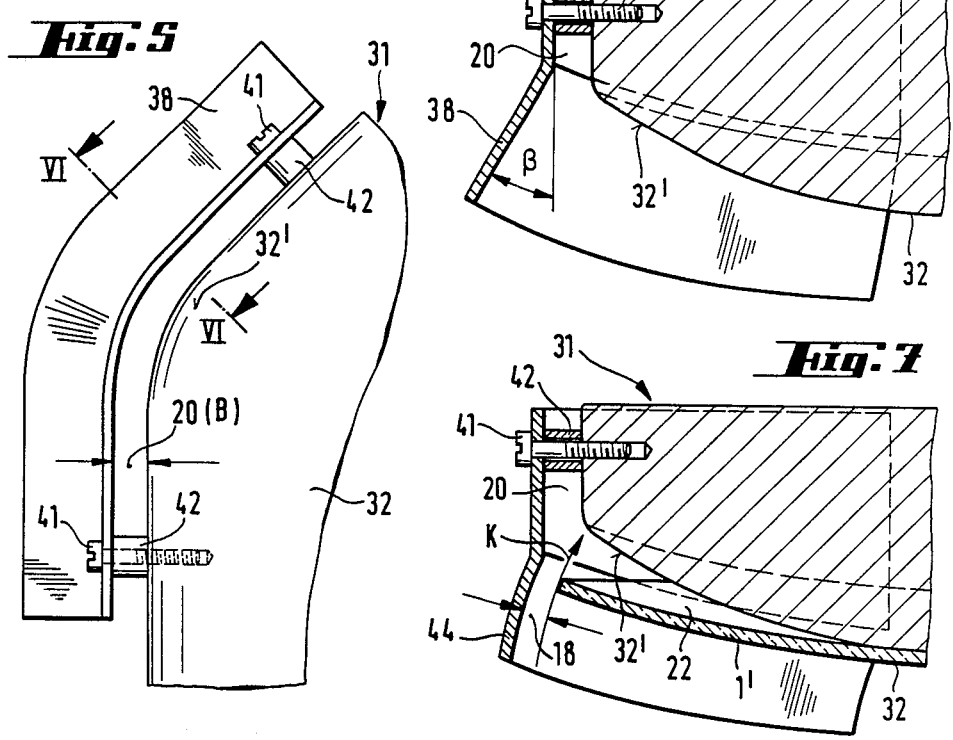

METHOD AND APPARATUS FOR CURVING A GLASS SHEET

BACKGROUND OF THE INVENTION

1. Field of the Invention

The invention relates to a method of curving a glass sheet which has been heated to bending temperature. The method employs a hot gas stream with a large cross sectional area, whereby the glass sheet is pressed against a curving form.

2. Background of the Prior Art

A curving method of this type is described in Ger. OS 35 23 675. In this method, the glass sheet heated to bending temperature is conveyed in a horizontal attitude on a roller conveyor, to a curving station at which it is lifted from the conveyor by means of an upwardly directed hot gas stream with a large cross sectional area and is pressed against a curving form disposed above the conveying rollers, which curving form is convex in the direction toward the conveyor. The glass sheet acquires the shape of the curving form, and is then deposited on a support rng which is operated below the curving form, whereby the glass sheet is transported out of the curving station.

If glass sheets are to be curved, with the aid of this known method, into a shape having, e.g., edge region locations which are deeply curved, the pressure exerted on the edge regions by the gas stream is insufficient under the given conditions to press the glass sheet tightly against the curving form at the locations of these deeply or sharply curved edge regions. As a result, the shape of the curved glass sheet will differ from the prescribed contour of the curving form. it has been found that this difficulty cannot be alleviated by increasing the pressure of the hot gas stream, i.e. by increasing its flow speed.

SUMMARY OF THE INVENTION

The underlying problem of the invention is to improve the method referred to above such that it can be employed also to manufacture sharply curved glass sheets or glass sheets with strongly bent or curved edge regions.

This problem is solved according to the invention in that at least in certain prescribed edge regions of the glass sheet the flow speed of the flow component (of the hot gas stream) traveling in the radial direction along the surface of the glass sheet is reduced by the interposition of barriers to this flow component, whereby the static pressure component of the flowing gas is increased in these regions.

The inventive method makes use of the fact that the static pressure component in a flowing gas acts in all directions, whereas the dynamic pressure component acts only in the direction of flow of the gas. In the edge regions of the glass sheet, the flow directed normal to (and toward) the glass sheet actually impinges on the sheet only in attenuated form, because the gas impinging on the sheet in the middle of the field is redirected at the surface of the glass so that it flows in the radial direction along the glass sheet and thereby reduces the effect of the stream flowing in the original flow direction in the edge region of the glass sheet. If the edge region of the curving form has greater curvature or if the edge region is at an unfavorable angle of inclination to the direction of the gas stream, then the dynamic pressure acting normal to the surface of the glass is insufficient to develop the desired curving forces, as a result of the flow direction parallel to the glass surface. In this connection, the invention provides means of suitably increasing the static pressure component in these regions. It is known that in a flowing gas or liquid system the sum of the static and dynamic pressures is constant in a given streamline; therefore, the static pressure, which is more effective as to the curving action in the present case, must increase if the flow speed of this streamline is decreased. According to the invention, the desired reduction of the flow speed in the region in question is achieved by interposing suitable barriers in the path of the local flow or at the end of said flow, which barriers impede said flow of hot gas and reduce its speed.

In an advantageous refinement of the invention, at the same time the static pressure behind the glass sheet (i.e. between the glass sheet and the surface of the curving form) is reduced by connecting this intermediate space with the space behind the curving form.

According to a first preferred embodiment of the inventive method, the radially directed flow of hot gas passing along the edge regions in question (of the glass sheet) is directed past the end of the curving form under conditions of reduced flow cross section at the intermediate space formed between the curving form and the glass sheet.

According to another preferred embodiment of the inventive method, the path of the radially directed flow of hot gas along the edge regions in question (of the glass sheet) is completely blocked by barriers disposed on the curving form, and the static gas pressure in the intermediate space between these edge regions of the glass sheet and the forming-surface of the curving form is reduced, by connecting this intermediate space to the space on the other side of the curving form, which is at a lower static pressure; said connection being accomplished by holes in the curving form.

Suitable apparatus for carrying out the inventive method is distinguished basically in that pressure baffles are installed on the edge of the curving form at locations at which the static pressure component of the gas stream is to be increased, which baffles are disposed approximately normally to the terminal tangents of the curving form.

BRIEF DESCRIPTION OF THE INVENTION

The invention will now be described in more detail with reference to the drawings.

Figure 1:
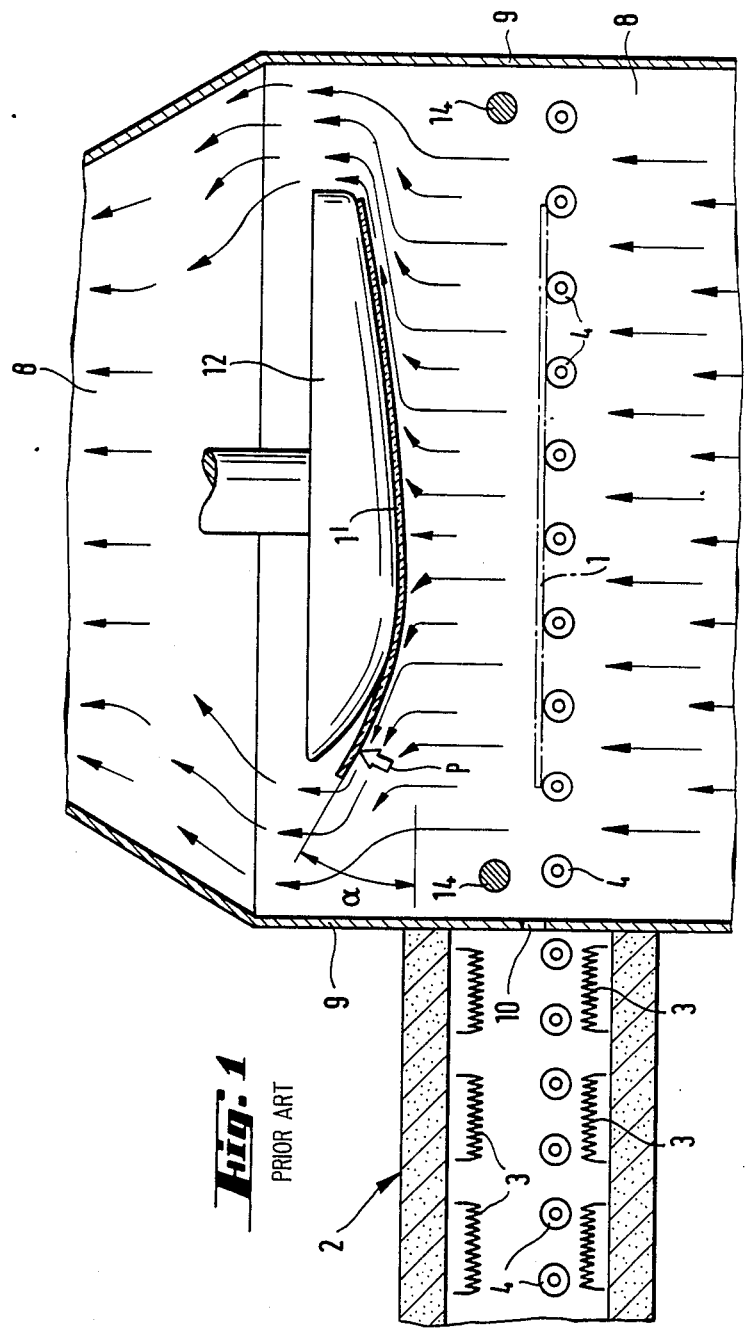
FIG. 1 is a vertical cross section through a curving chamber for pressure-curving a glass sheet with a hot gas stream, according to the state of the art.

FIG. 4 lllustrates, in a perspective view, a curving form for an automobile pane, with pressure baffles for realizing the method;

FIG. 5 is a bottom view of a detail of the curving form illustrated in FIG. 4;

FIG. 6 is a cross section through line VI—VI of FIG. 5; and

FIG. 7 is a cross sectional view of a different embodiment of the configuration of a pressure baffle.

A curving station for pressure-curving a glass sheet 1 with the aid of a hot gas stream, particularly a hot air stream, is disposed adjoining a roller pass-through furnace 2 wherein the glass sheets are heated to bending temperature by means of electrical radiator elements 3. The glass sheets 1 are conveyed horizontally on a roller conveyor comprised of driven rollers 4, which conveyor extends into the curving station.

The curving station essentially comprises a vertical flow channel 8 the walls 9 of which are provided with a suitable layer of thermal insulation (not shown). The glass sheets 1 pass from the furnace 2 into the curving station via the opening 10 in the wall 9 of the flow channel 8 which wall adjoins the furnace 2. The sheets 1 are positioned under the curving form 12 in the curving station. During conveying of the sheets 1 into the curving station and during positioning, the volumetric flow and the pressure of the gas stream flowing vertically upward are kept low. The said flow and pressure may be kept at a value appropriate to offset the weight of the sheet 1 so as to avoid deformation of the sheet due to sagging between the conveyor rollers 4 under the action of gravity. The degree of offset of the weight should be only partial, however, because the capability to convey the sheet 1 by rotating the conveyor rollers 4 must be maintained.

As soon as the glass sheet 1 reaches its desired position, the pressure and volumetric flow are increased to the extent that the sheet 1 is lifted from the conveyor rollers 4 and is pressed against the forming surface of the curving form 12. A carriage (not shown) traveling on rails 14 transverse to the plane of FIG. 1 is then moved under the curved glass sheet 1'. This carriage bears a support ring which matches the shape of the curved glass sheet. The gas pressure and volumetric flow rate in the flow channel 8 are decreased, whereby the curved glass sheet is lowered onto the support ring, and said sheet is transported out of the curving station.

The gas stream acting on the glass sheet 1 has a generally uniform pressure profile over its cross section. During the period when the sheet 1 is lifted from the conveyor rollers 4 and raised to contact the curving form 12, the pressure over the surface of the glass sheet is essentially uniform. However, this situation changes as soon as the glass sheet becomes held by the form 12. From this point on, the gas incident on the glass sheet 1 must flow laterally along the surface of the glass sheet, and is redirected upward at the edge of the curving form 12. In the end regions of the glass sheet 1', the flow of the gas past (the sheets) has two effects: (1) it counteracts the direct effect of the upwardly flowing gas, so as to reduce the effect of the vertically acting dynamic pressure component in these edge regions, because vertical flow is deflected horizontally, and the gas streams flowing past (the sheet) in the edge regions diminish the action of the vertical flow incident on said gas streams, and (2) the dynamic pressure component of the radially flowing gas flowing along the glass sheet 1' does not itself have any pressure component directed normally to the surface of the glass sheet, so that the gas flowing past the sheet in the neighborhood of the sheet makes no contribution to the curving process. Accordingly, the bending forces exerted on the edge region of the glass sheet are diminished further as the surface area of the glass sheet is increased and as the terminal tangent angle alpha during the bending process is increased. The bending force P exerted in this fashion is no longer sufficient to press this edge region of the glass sheet 1' intimately against the forming surface of the curving form 12.

Figure 2:
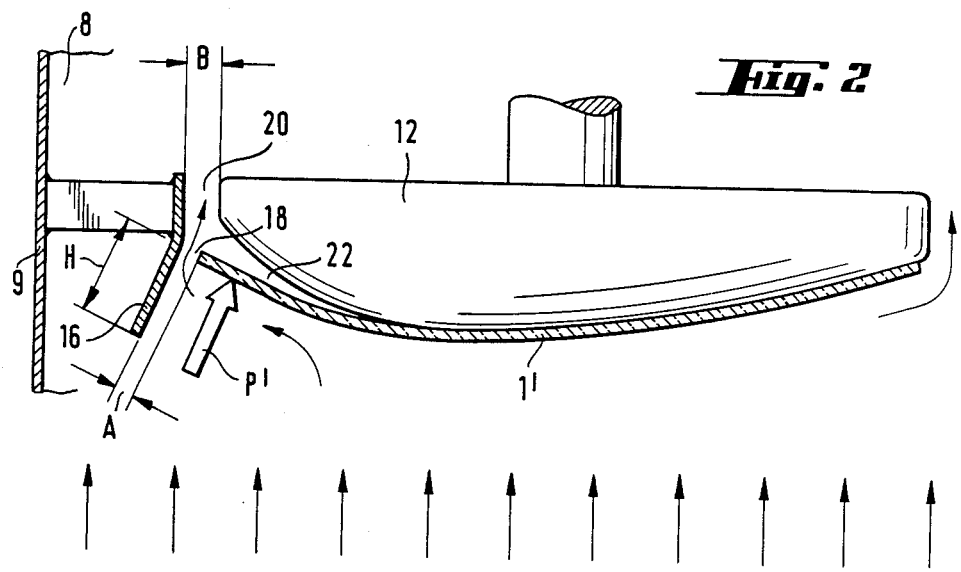
FIG. 2 illustrates the operation of a first embodiment of the inventive method, with a cross sectional view in the region of the curving form.

FIG. 2 illustrates a first configuration with which, according to the invention, the bending forces at the critical locations can be increased to effective levels, at very low expense. For this purpose, at the locations with more substantial bending the flow speed of the gas stream flowing along the glass sheet 1' is reduced by interposing a pressure baffle 16, disposed approximately perpendicularly to the (said) stream. Thereby the gas flow is retarded, and is forced to pass through the gap 18 remaining between the glass sheet 1' and the pressure baffle 16, and thence upward through the gap 20 between the upper part of the pressure baffle 16 and the edge of the curving form 12. The static pressure below the glass sheet 1' is increased, as a result of the reduction of the flow speed of the flow of gas along the glass sheet, in that the relation holds according to which the sum of the dynamic and static pressure is constant in a given streamline. This static pressure, now P', acts as increased bending pressure on the glass surface. At the same time, the static pressure in the space 22 is reduced because the space 22 communicates directly, via the gap 20, with the space above the curving form 12, where (in said space above the curving form 12) the static pressure is, on the whole, lower.

The inventive measures are particularly effective if the pressure baffle 16 is formed and disposed such that the width A of the gap 18 formed by the glass sheet 1' and the baffle 16 is less than the width B of the gap 20 formed by the baffle 16 and the edge of the curving form 12. The width B of the gap 20 may be, e.g., 5–20 mm and the width A of the gap 18 may be preferably 2–10 mm. The height H of the part of the baffle 16 which performs the baffling function is, e.g., 10–100 mm, preferably 20–50 mm.

Figure 3:
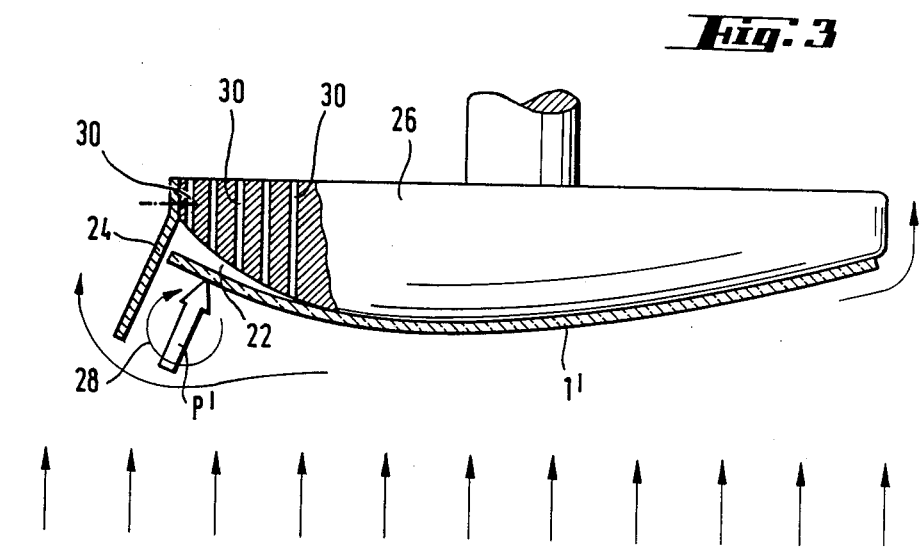
FIG. 3 illustrates the operation of a second embodiment of the inventive mentod, also with a cross sectional view in the region of the curving form.

In the exemplary embodiment illustrated in FIG. 3, a similar desired effect is achieved by slightly different means. In this case, the pressure baffle 24 is disposed directly on the edge of the curving form 28; thus there is no flow of the gas between the baffle 24 and the curving form 26. Accordingly, gas eddies 28 form ahead of the baffle 24, and the gas flow going toward the baffle is forced around the baffle 24. There is no radially directed flow in the immediate neighborhood of the glass sheet 1'. In view of the fact that the kinetic flow energy is substantially diminished, the static pressure component is substantially increased (since the overall pressure energy remains constant). The result is an increase in the active bending force P'. The required diminished pressure on the rear side of the glass sheet 1' is provided by virtue of holes 30 in the curving form 26, which pass through said curving form 26 and which join the space 22 (between the glass sheet 1' and the curving form 26) to the space behind the curving form 26, in which latter space the static pressure is lower.

FIGS. 4 to 7 illustrate a specific exemplary embodiment for inventively configured curving forms for curving a rear side pane for an automobile. The overall configuration and the contour of the curving surface of curving form 31 exactly match the size and shape of the curved glass sheet. The curving form 31, which may be comprised of, e.g., ceramic or metal material, is provided with a cylindrical appendage 36 which is connected via the connecting flange 39 to the holding tube 40 disposed in the curving station.

Experience shows that higher bending forces are required in the edge regions 32' and 32" of the bending surface 32, because these are corner regions needing to be spherically bent, and because the terminal tangent angle of the surface of the form in these regions is greater than in the ordinary regions. Accordingly, pressure baffles 38 are disposed at the edge of the curving form 31 in these regions 32' and 32'', in such a way that a gap (20) of size about 10 mm (B) is left between the perimeter surface of the curving form 31 and the surface of baffle 38 which surface of baffle 38 faces the said perimeter surface. The baffle 38 is attached to the curving form 31 by screws 41. The required spacing from the curving form is provided by spacer bushings 42. The angle beta which the baffle 38 forms with the vertical is selected according to the curvature of the curving form, such that the surface of the baffle which is active as a barrier extends approximately perpendicularly to the direction of flow of the radial gas stream flowing along the glass sheet.

In many cases it may be advantageous to arrange the disposition such that the gap which remains between the baffle and the edge of the glass sheet remains constant over the entire path [of movement] of the edge of the glass sheet during the curving process. In this case it is recommended that the configuration of the baffle correspond to that of baffle 44 of FIG. 7, with a curvature corresponding to the curve K which describes the excursion of the edge of the glass sheet 1' during the curving process. In this way, a very narrow gap 18 can be maintained during the entire curving process, which can result in further-improved pressure conditions during said process.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of curving a glass sheet which has been heated to its bending temperature, comprising blowing a hot gas stream with a large cross-sectional area against said sheet, to press said sheet against a curved forming surface of a curving form,
    increasing the static pressure component of the hot gas stream at at least one region adjacent a portion of the periphery of said form where said surface is sharply curved, by means of a barrier positioned adjacent to, but spaced from, said periphery portion and extending below said glass sheet when applied against said frame.

2. A method according to claim 1, further comprising reducing the static pressure in the space between the edge regions of the glass sheet and the surface of the curving from by connecting this intermediate space with the space behind the curving form.

3. A method according to claim 1, wherein the radially directed flow of hot gas passing along said edge regions is directed past the end of the curving form under conditions of reduced flow cross section at the intermediate space formed between the curving form and the glass sheet.

4. A method according to claim 3, wherein in order to additionally reduce the static gas pressure in the space between the edge regions of the glass sheet and the curving form, this space is connected to the pace on the other side of the curving form by means of holes passing through the curving form.

5. A method of curving a glass sheet which has been heated to bending temperature, comprising blowing a hot gas stream with a large cross-sectional area against said sheet to press said sheet against a curved forming surface of a curving form,
    increasing the static pressure component of the gas current at at least one region adjacent a portion of the periphery of said form where said surface is sharply curved, by means of a barrier disposed on said portion of the periphery, and
    reducing the static pressure between the glass sheet and said forming surface in said region by providing a passageway through said form from said region to a space on the opposite side of said form, in which space the static pressure is reduced.

6. An apparatus for curving a glass sheet which has been heated to bending temperature, comprising a curving form having a forming surface against which said glass sheet is applied, and at least one pressure baffle adjacent to, but spaced from, said curving form,
    said baffle being disposed adjacent at least one region of the periphery of said curving surface which sharply curved and being oriented approximately perpendicularly to the terminal tangents of said forming surface of the curving form.

7. An apparatus according to claim 6, wherein the pressure baffles are attached to the curving form while being held at a distance of approximately 5-20 mm therefrom, thereby forming a gap between the baffles and the edge of the curving form.

8. An apparatus according to claim 7, wherein the curving form is provided with holes passing through it, in the regions adjacent the pressure baffles. said pressure baffles.

9. An apparatus for curving a glass sheet which has been heated to its bending temperature, comprising a curving form bearing a curved forming surface,
    the periphery of said curved forming surface bearing, in at least one region where said surface is steeply curved, at least one pressure baffle disposed on said periphery, oriented approximately perpendicularly to the terminal tangents of the forming surface of the curving form, said curving form bearing holes therethrough in the region adjacent said pressure baffle.

10. Apparatus of claim 6, wherein the functional portion of said baffle is from 10-100 mm in length.

11. Apparatus of claim 10, wherein said length is from 20-50 mm.

12. Apparatus of claim 6, wherein said baffle is curved along its length such that it is approximately the same distance from the edge of the glass sheet at all times during the bending of said sheet.

* * * * *